(No Model.) 2 Sheets—Sheet 1.

W. S. G. BAKER.
DUST GUARD FOR CAR AXLE BOXES.

No. 361,255. Patented Apr. 19, 1887.

WITNESSES
E. A. Newman.
C. M. Newman.

INVENTOR
W. S. G. Baker.
By his Attorneys
Baldwin Hopkins & Peyton.

(No Model.) 2 Sheets—Sheet 2.

W. S. G. BAKER.
DUST GUARD FOR CAR AXLE BOXES.

No. 361,255. Patented Apr. 19, 1887.

WITNESSES
E. A. Newman,
C. M. Newman.

By his Attorneys
Baldwin Hopkins & Peyton

INVENTOR
W. S. G. Baker,

UNITED STATES PATENT OFFICE.

WILLIAM SEBASTIAN GROFF BAKER, OF BALTIMORE, MARYLAND.

DUST-GUARD FOR CAR-AXLE BOXES.

SPECIFICATION forming part of Letters Patent No. 361,255, dated April 19, 1887.

Application filed January 22, 1887. Serial No. 225,164. (No model.)

*To all whom it may concern:*

Be it known that I, WILLIAM SEBASTIAN GROFF BAKER, of Baltimore city, in the State of Maryland, have invented certain new and useful Improvements in Dust-Guards for Car-Axle Boxes, of which the following is a specification, reference being had to the accompanying drawings, in which—

Figure 1:
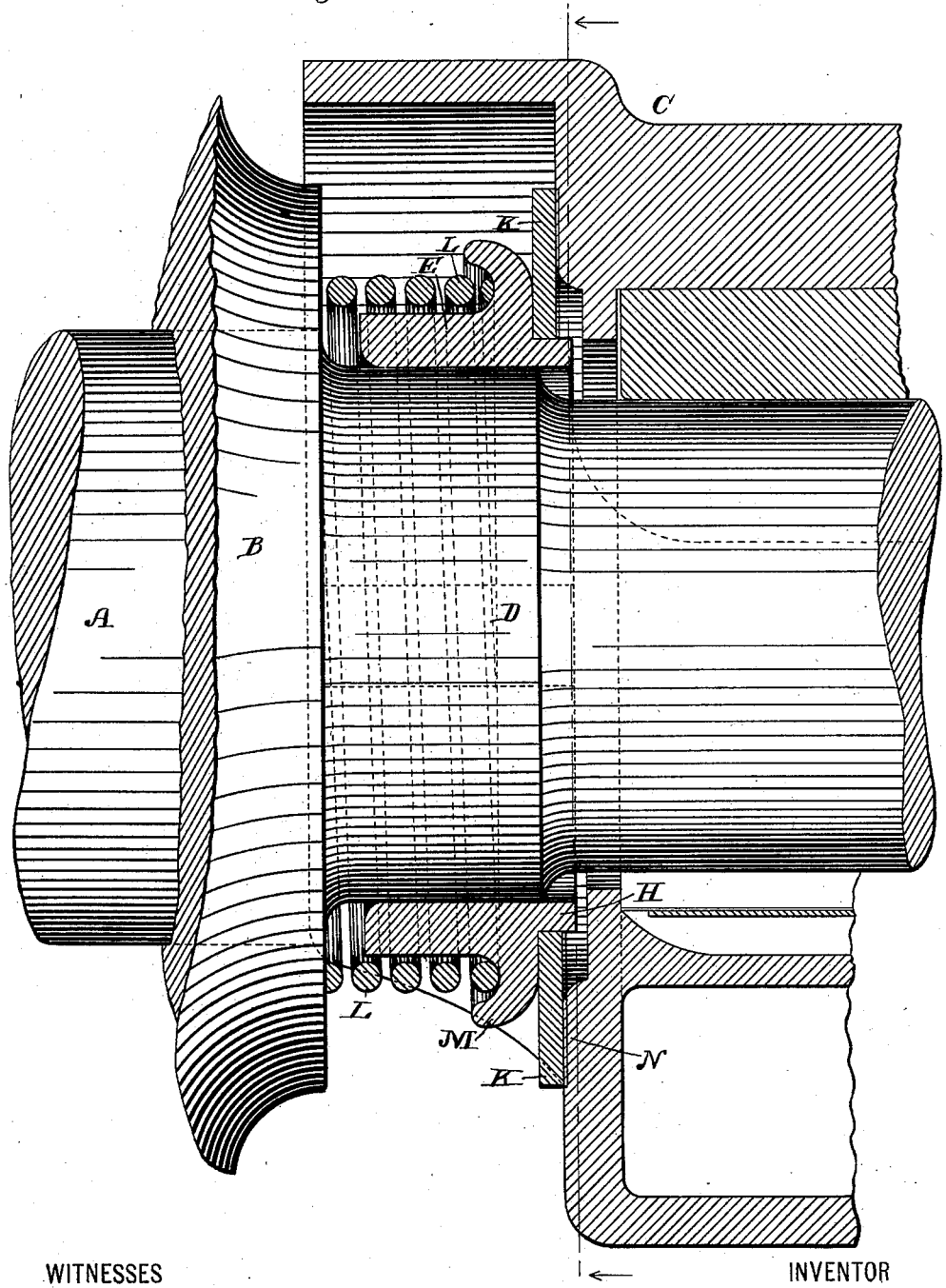
Figure 2:
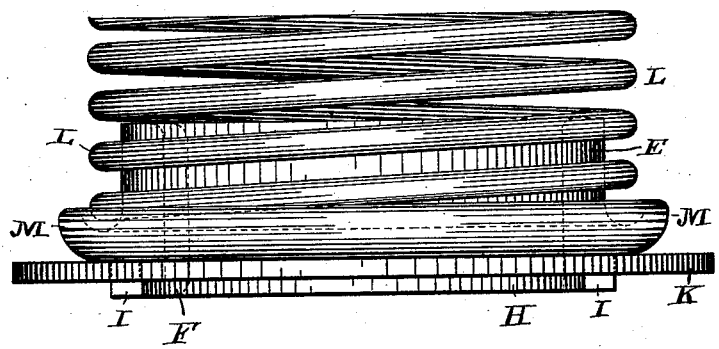
Figure 3:
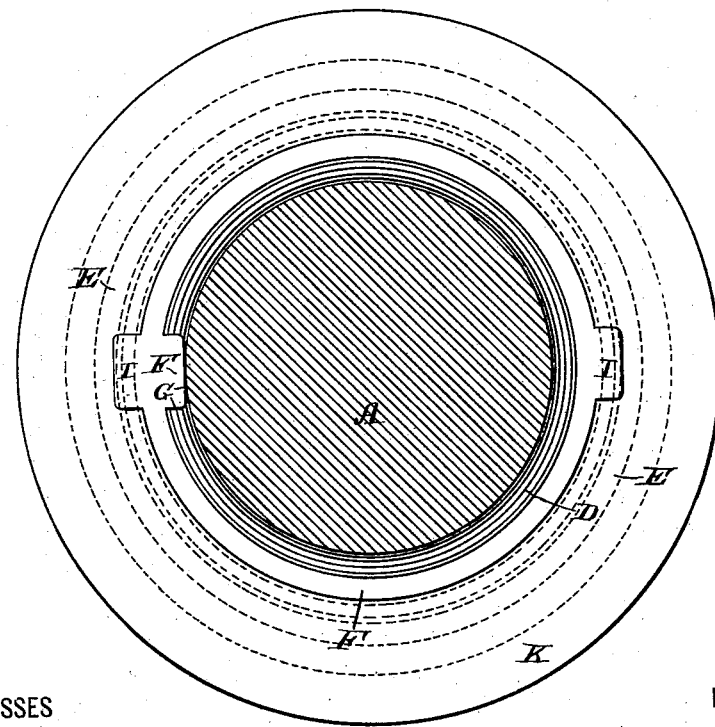

Figure 1 is a view of so much of a car-axle box in section and of a wheel and axle as is necessary to illustrate my invention applied to use. Fig. 2 is a detached view of a sleeve and spring-cushion around it. Fig. 3 is a section on the line 3 3 of Fig. 1.

The object of my invention is to provide a cheap, simple, durable, and effective dust-guard for car-axle boxes; and my invention consists in the organizations or combinations of parts hereinafter described, and succinctly stated in my appended claims.

It is also in its general nature somewhat similar to, but is an improvement upon the dust-guard features of my United States Patents Nos. 247,236 and 292,399.

Referring to the letters upon the drawings, A indicates a car-axle, B a section of a car-wheel, and C a car-axle box, which parts may be of any ordinary construction. Around that part D of the axle known as the "dust-collar" I place a metallic sleeve, E, preferably formed with a feather, F, on its inner side, which fits in a longitudinal groove or keyway, G, in the dust-collar of the axle, so that the sleeve, while keyed to the axle so as to revolve with it, is free to move longitudinally upon it. Any other method of connecting the sleeve and axle, so that the sleeve will rotate with the axle and at the same time have longitudinal movement upon it, may be adopted.

The face of the sleeve next to the axle-box is provided with an annular projection, H, having lugs I I, for the purpose of securing a suitable washer, K, which may be of vulcanized fiber or other suitable material, in place, and causing it to revolve with the axle and sleeve. This is the method I prefer of connecting the sleeve and washer, although any other ordinary method of connecting the parts together may be adopted.

L indicates a coiled spring around the outside of the sleeve E, bearing at one end upon a ledge or projection, M, which is a part of the sleeve, and at the other end against the car-wheel. This spring forms a cushion between the sleeve E and the car-wheel, and causes the sleeve to press against the washer K and cause it to bear upon the end of the axle-box, so as to make a tight joint and exclude dust from the box and prevent the oil from escaping. Instead of a ledge, M, I might have lugs or projections, or any other ordinary stops or abutments, so that one end of the spring-cushion would bear against or operate upon the sleeve.

I may prefer sometimes to employ a suitable stationary liner, N, fixed to the box, to form a bearing for the sleeve E; but this is not essential to the operation of my invention.

In addition to the mere formal changes above mentioned, there are still others that might be made without departing from the substance of my invention—as, for a single example, there might be two or more coiled springs to form a spring-cushion, although I prefer a single spring coiled around the sleeve.

What I claim to be new, and desire to secure by Letters Patent of the United States, is—

1. The combination, with a wheel, an axle, and an axle-box, of a sleeve, E, fixed to the dust-collar D, a spring-cushion, L, coiled around the sleeve and between it and the car-wheel, and a washer, K, between the sleeve and the axle-box, substantially as set forth.

2. The combination, with a wheel, an axle, and an axle-box, of a sleeve, E, a spring-cushion around the sleeve and between it and the car-wheel, a ledge or bearing for the spring-cushion upon the sleeve, the annular projection H, and a washer, K, secured to the same, substantially as set forth.

In testimony whereof I have hereunto subscribed my name.

WILLIAM SEBASTIAN GROFF BAKER.

Witnesses:
CHAS. W. KOHLMANN,
J. PAUL BAKER.